United States Patent [19]
Hickman

[11] Patent Number: 5,332,703
[45] Date of Patent: Jul. 26, 1994

[54] BATCH COMPOSITIONS FOR CORDIERITE CERAMICS

[75] Inventor: David L. Hickman, Big Flats, N.Y.

[73] Assignee: Corning Incorporated, Corning, N.Y.

[21] Appl. No.: 26,467

[22] Filed: Mar. 4, 1993

[51] Int. Cl.$^5$ .................. C04B 35/16; C04B 35/18; C04B 35/20

[52] U.S. Cl. .................................. 501/119; 501/118; 501/120; 501/122; 501/128; 264/63; 264/177.12

[58] Field of Search ................ 264/63, 177.12; 501/9, 501/118, 119, 120, 122, 128

[56] References Cited

U.S. PATENT DOCUMENTS

| | | | |
|---|---|---|---|
| 2,864,919 | 12/1958 | Stringfellow | 200/144 |
| 3,885,977 | 5/1975 | Lachman et al. | 501/119 |
| 3,950,175 | 4/1976 | Lachman et al. | 501/118 |
| 4,280,845 | 7/1981 | Matsuhisa | 501/119 |
| 4,722,916 | 2/1988 | Watanabe et al. | 501/119 |
| 4,877,670 | 10/1989 | Hamanaka | 428/116 |
| 5,030,398 | 7/1991 | Hamanaka et al. | 264/63 |
| 5,114,643 | 5/1992 | Beall et al. | 501/120 |

*Primary Examiner*—Karl Group
*Assistant Examiner*—C. M. Bonner
*Attorney, Agent, or Firm*—Kees van der Sterre

[57] ABSTRACT

Ceramic products consisting principally of cordierite and a method for making them are provided, the method employing batches comprising a mineral component and a chemical component, the mineral component comprising clay and talc and the chemical component consisting essentially of a combination of the powdered oxides, hydroxides, or hydrous oxides of magnesium, aluminum and silicon. Ceramics made by extrusion and firing of the batches can exhibit low porosity, high strength and low thermal expansion coefficients.

18 Claims, No Drawings

BATCH COMPOSITIONS FOR CORDIERITE CERAMICS

The Government of the United States of America has rights in this invention pursuant to Contract No. DEN3-336 awarded by the U.S. Department of Energy.

BACKGROUND OF THE INVENTION

The present invention relates to cordierite ceramics, and more particularly to cordierite ceramics produced by the firing of chemically modified mineral batches for such ceramics.

The production of cordierite ($2MgO-2Al_2O_3-5SiO_2$) ceramics from mineral batches containing mineral sources of magnesium alumina, and silica such as clay and talc is well known. Such processes are described, for example, in U.S. Pat. No. 2,864,919. The manufacture of thermal-shock-resistant cordierite honeycomb ceramics from clay/talc batches by extruding the batches and firing the extrudate to provide ceramics with very low thermal expansion coefficients along at least one axis, is disclosed in U.S. Pat. No. 3,885,977.

The selection of mineral batch materials to be used in the production of cordierite ceramics by extrusion has been found to significantly affect the final properties of the resulting ceramics. For example, U.S. Pat. No. 4,280,845 describes the effects of varying the particle size and porosity of talc on the thermal shock resistance and porosity of the resulting cordierite ceramics.

It has been proposed to utilize extruded honeycomb materials composed of cordierite in rotary heat exchangers (regenerators) for gas turbine and other heat engines. For best performance as a regenerator, high strength in combination with low porosity and high thermal shock resistance are required. U.S. Pat. Nos. 4,877,670 and 5,030,398 describe cordierite ceramics exhibiting improved characteristics for these applications, produced by utilizing mineral (talc and clay) batch components of small and carefully defined particle sizes. The products provided in accordance with these patents reportedly exhibit thermal expansion coefficients (CTE values) in the $5-12\times10^{-7}/°C$. range, typically with total porosities of 25-35 volume percent.

While such ceramics represent an improvement in properties over extruded cordierite ceramics produced using more conventional mineral sources, still further improvements in these products, particularly with respect to thermal expansion, porosity and strength, would be desirable. This is because heat regenerators and other components exposed to continuous heating and cooling in normal use must exhibit exceptionally high thermal durability in order to insure that reasonable service life will be attained.

One of the problems with existing extruded cordierite ceramics is that they exhibit only limited thermal durability under repeated thermal cycling. Hence, when thermally cycled within and above the 600°-800° C. temperature range during exposure to hot flowing exhaust gases, these materials can demonstrate significant strength reductions, particularly in regions near the hot face of the regenerator subjected to the highest temperatures.

It is therefore a principal object of the present invention to provide improved cordierite ceramics, and a method for making them, such that the ceramics exhibit higher strength in combination with lower overall porosity, for the purpose of achieving improved durability in a high temperature thermal cycling environment.

It is a further object of the invention to provide a method which utilizes modified ceramic batch compositions to produce extruded cordierite ceramics with improved properties.

Other objects and advantages of the invention will become apparent from the following description thereof.

SUMMARY OF THE INVENTION

In accordance with the present invention, improved cordierite ceramics are provided from batch compositions which consist in part of conventional mineral sources for magnesia, alumina and silica, (i.e., clay, talc, and other minerals), and in part of powdered oxide or so-called chemical batch constituents. The powdered oxide constituents of the batch, comprising magnesium, aluminum and silicon oxides, hydroxides, and/or hydrous oxides, if present in controlled proportions, can effect a significant reduction in porosity in the fired cordierite ceramics and substantial increases in strength. Moreover, these results can be achieved without unduly increasing the thermal expansion coefficient of these ceramics.

In one aspect, then, the invention includes a batch for a cordierite ceramic product which comprises a mineral component and a chemical component. The mineral component of the batch comprises clay and talc, and the chemical component consists essentially of a combination of powdered oxidic magnesium, aluminum and silicon compounds. By powdered oxidic compounds or powdered oxides is meant any of the known particulate oxides, hydroxides, and/or hydrous oxides of magnesium, aluminum and/or silicon, all of which are potential sources for the pure oxides of these metallic constituents and thus useful for the formulation of the chemical batch components employed in the practice of the invention.

It is found that, when the powdered oxides making up the chemical component of the batch are present in a proportion constituting 5-50% by weight of all inorganic batch solids (the total of the powdered oxidic materials and the mineral batch component), significant improvements in the properties of the ceramics can realized. Best results are obtained when the relative proportions of the powdered oxidic compounds comprising the chemical batch component, as well as the overall composition of the resulting chemical/mineral batch, approximate the composition of mineral cordierite. Significant deviations from this composition can risk increasing the low thermal expansion properties characteristic of extruded ceramics consisting principally of cordierite.

In another aspect, the invention includes a method for making a cordierite ceramic product by compounding a batch containing source materials for silica, alumina and magnesia and firing the batch to convert the source materials to cordierite ceramics. In accordance with the invention, the batch will comprise a mineral component and a chemical component, the mineral component comprising clay, talc and alumina and the chemical component comprising powdered oxidic magnesium, aluminum, and silicon compounds.

As noted above, to achieve the desired improvements in the properties of the ceramic products, the mineral component of the ceramic batch will contribute 50-95% by weight of the fired ceramic product and the chemical component will contribute 5-50% by weight thereof.

In yet a third aspect, the invention includes a ceramic article having a principal crystal phase composed of cordierite ($2MgO.2Al_2O_3.5SiO_2$) and exhibiting improved properties for applications such as ceramic regenerators. At a minimum, these ceramics will exhibit enhanced strength, characterized as having a modulus of rupture strength of at least 3300 psi. At the same time the article will exhibit a total porosity not exceeding about 23% by volume and an average coefficient of thermal expansion, on at least one dimensional axis of the ceramic article, which is in the range of $3-6 \times 10^7/°C$. over the temperature range RT-800° C.

DETAILED DESCRIPTION

Ceramic products provided in accordance with the invention consist principally of cordierite crystals, i.e., they contain a cordierite crystal phase constituting at least about 90% by weight of the fired ceramic, more typically 94% or more of the fired ceramic. As is well known, other crystal phases in addition to the cordierite may be present in magnesium aluminosilicate ceramics depending upon the precise composition of the batch. Such additional phases may include, for example, spinel, sapphirine, mullite, corundum, and other phases, but these will constitute at most only minor phases in the ceramics of the invention.

The mineral components of the batches of the invention will normally include clay and talc as the principal raw material sources of magnesia, silica, and some of the alumina. Where clay and talc constitute the sole mineral sources of alumina, supplemental alumina in the form of alumina powder will normally be included as part of the mineral batch component, to bring the mole proportion of alumina up to the proportion present in mineral cordierite.

The sources of the talc, clay, and alumina constituents of the mineral batch component are not critical. Any of the various source minerals having known utility for the production of cordierite ceramics may be employed, and the best materials for any particular application of interest may in each case be readily identified by routine experiment.

The mineral component of the batch may, if desired, contain mineral sources of oxides other than or in addition to talc and clay. Examples of such raw materials include pyrophillite, kyanite, quartz, and fused silica. However, these batch constituents are not generally used in significant proportions since they tend to increase the thermal expansion coefficient of an extruded cordierite ceramic. Thus in the preferred batches of the invention clay and talc will normally constitute the sole sources of silica and magnesia in the mineral component of the batches.

The selection of the oxidic constituents to be used in formulating the chemical component of the batch is likewise not critical. As an example, the various types of alumina powder useful to supplement the clay and talc constituents of the mineral batch component can also be used to provide the alumina source for the chemical batch component, if desired. Alternatively, other aluminum oxide materials such as boehemite (hydrous alumina) may be employed. Similarly, in the case of the magnesium constituent, magnesium oxide and/or magnesium hydroxide could interchangeably be used.

Overall batch proportions of silica, alumina and magnesia which will result in the adequate development of a principal cordierite crystal phase in the course of firing the batch include those comprising, as calculated in weight percent on the oxide basis from the batch, about 41-56.5% $SiO_2$, 30-50% $Al_2O_3$, and 9-20% MgO. For a higher cordierite crystal content and best low expansion characteristics, batch oxide compositions will preferably consist essentially, in weight percent, of about 47-53% $SiO_2$, 33-41% $Al_2O_3$ and 11-17% MgO.

As suggested above, it is important that the chemical component of the batch not exceed about 50% by weight of batch oxides, nor less than about 5% by weight thereof. The addition of a chemical component in less than the required minimum proportion will not effectively improve the properties of the fired ceramic, especially with respect to reducing the porosity thereof. On the other hand, an overly large chemical component will unacceptably increase the thermal expansion of the cordierite ceramic, risking reduced thermal shock resistance in the product.

While additions of as little as 5-20% of the chemical batch component can effect a reduction in the thermal expansion of the fired ceramic, strength improvements from such an addition are small and the resulting porosity reductions may not be substantial. On the other hand, the addition of 45-50% of chemical components, while imparting excellent strength and low porosity, can increase the thermal expansion coefficient of the fired ceramic to levels which may be too high for some applications. Therefore, best product performance in terms of expansion, strength, and porosity are achieved when batch compositions comprising 25-40% by weight of the chemical batch component are utilized.

Provided that the appropriate limits on the proportions of chemical batch components are observed and the overall batch composition is selected to minimize the development of crystal phases other than cordierite in the fired ceramics, cordierite ceramic products with properties particularly well adapted for the uses hereinabove described may be produced. In particular, fired cordierite honeycomb structures exhibiting average coefficients of thermal expansion (RT-800° C.) on at least one dimensional axis not exceeding about $4.8 \times 10^{-7}/°C$., with a total overall porosity not exceeding about 20% (volume) and a modulus of rupture strength of at least about 4000 psi can be provided. This desirable combination of properties offers unique advantages, for example, in a heat regenerator environment.

The following working examples, which are intended to be illustrative rather than limiting, more fully show the production of cordierite ceramic products in accordance with the invention.

EXAMPLES

Several batches for a series of cordierite ceramics are compounded. Each batch contains a mineral component and a chemical component, and is formulated to provide an overall batch oxide composition, in weight percent, of about 13.7% MgO, 34.9% $Al_2O_3$, and 51.4% $SiO_2$. A control batch consisting only of mineral batch constituents (no chemical component) is also prepared.

The mineral component of each batch consists of a clay-talc-alumina blend. The blend consists of Pfizer 95-27 talc, DBK Glomax LL clay, DBK K10 clay, and Alcoa A16 SG alumina, these constituents being provided in the relative proportions of 40.75 parts talc, 30.77 parts LL clay, 14.8 parts K10 clay, and 13.68 parts alumina by weight. The same components in the same proportions are also used to provide the mineral control batch.

The chemical component of each of the batches consists of a powder mixture of Dispall 180 high purity boehmite (hydrous aluminum oxide with a loss on ignition of 20 weight percent), MagChem 20M magnesia, and DeGussa OX 50 silica (an amorphous colloidal silica). These powders are employed in proportions of about 13.8 parts MgO, 43.4 parts of boehmite, and 51.1 parts of the $SiO_2$ powder by weight, the powders being combined and thoroughly mixed to provide a homogeneous powder blend.

To provide batches for extruded products consisting of blends of these chemical and mineral components, each of the two components is first prepared separately in large volume as an extrudable batch component, including additions of vehicle and binders sufficient to achieve good mixing consistency. The vehicle employed in each case is water.

The batch for the mineral component includes about 3% of Methocel F40 methyl cellulose binder and 0.75% SAN sodium stearate as a lubricant, while the batch for the chemical component utilizes the same additives but with an increase in methyl cellulose binder level to about 6% by weight. The component batches thus provided are then combined in selected proportions in a muller mixer and blended with additions of water as necessary to achieve a good consistency for extrusion.

Table I below reports batch compositions for the control batch and a series of blended batches as above described. The relative proportions of the chemical batch component and mineral batch component are reported in weight percent for each batch, corresponding to the contribution of each component to the overall oxide composition of the batch exclusive of any added binder or other fugitive batch components.

TABLE I

| Batch Identification | Chemically Modified Batches | |
|---|---|---|
| | Percent Mineral Component (Wt.) | Percent Chemical Component (Wt.) |
| Control | 100 | — |
| 1 | 95 | 5 |
| 2 | 90 | 10 |
| 3 | 85 | 15 |
| 4 | 80 | 20 |
| 5 | 75 | 25 |
| 6 | 70 | 30 |
| 7 | 65 | 35 |
| 8 | 60 | 40 |
| 9 | 55 | 45 |
| 10 | 50 | 50 |

Extrusions of each of the batches reported in Table I are carried out to provide extruded green bodies of both rod and cellular configuration. The cellular extrusions are square-celled honeycomb bodies having 400 cells per square inch of frontal surface area. The extrusions are then dried at 110° C. for several days and finally fired to 1430° C. over a heating interval of 40 hours, being held at 1430° C. for 8 hours to obtain complete conversion to cordierite and then cooled over an interval of 14 hours.

Each of the batches reported in Table I produces a highly crystalline cordierite ceramic upon firing as described. However, the strength, porosity, and thermal expansion characteristics of the fired ceramics are found to vary depending upon the proportion of the chemical component incorporated in the batch.

Table II below reports selected properties for the ceramics produced from the batches reported in Table II. Included in Table II for each of the ceramic products are the modulus of rupture strength of the product, in psi, the average coefficient of thermal expansion of the product over the temperature range from room temperature (RT) to 800° C.($x10^7$/°C.), and the porosity of the product expressed in volume percent. The porosity values reported in Table II were determined by mercury porosimeter, and the modulus of rupture values by flexural testing of the extruded rod samples of the ceramics in 4-point bending at a stress rate of $10^5$ psi/min. and at room temperature.

TABLE II

| Batch Identification (% Chemical) | Thermal Expansion (RT-8000° C. × $10^7$) | M.O.R. (psi) | Porosity (Vol. %) |
|---|---|---|---|
| Control (0) | 4.4 | 3220 | 22.5 |
| 1 (5%) | 3.1 | 3320 | 22.9 |
| 2 (10%) | 3.4 | 3400 | 22.4 |
| 3 (15%) | 4.6 | 3400 | 23.3 |
| 4 (20%) | 4.5 | 3940 | 21.0 |
| 5 (25%) | 4.8 | 490 | 17.8 |
| 6 (30%) | 4.4 | 4040 | 15.3 |
| 7 (35%) | 4.7 | 3990 | 16.9 |
| 8 (40%) | 4.5 | 4390 | 13.5 |
| 9 (45%) | 6.1 | 4580 | 12.2 |
| 10 (50%) | 5.6 | 5130 | 13.2 |

As is evident from a study of the data in Table II, substantial reductions in porosity as well as significant strength enhancement can be achieved through the addition of appropriate proportions of chemical batch constituents to mineral cordierite batches. Further, these results can be achieved without undue increases in the thermal expansion coefficients of the cordierite ceramic products. In particular, at intermediate levels of chemical component addition such as additions of 25–40% by weight of the batch, no significant increases in thermal expansion from the expansion levels shown by all-mineral cordierite ceramics are observed even though significant reductions in porosity and increases in strength are obtained.

The thermal expansion results reported in Table II, which are average expansion values over the range from room temperature to 800° C., were consistent with additional thermal expansion data taken from the same cordierite ceramic compositions over the more limited high temperature regime of 600°–800° C. Performance in this temperature regime is of particular interest because it represents the major portion of the thermal cycling range typically encountered in heat regenerator applications.

Ceramics produced from all-mineral batches (such as the control sample shown in Tables I and II) typically exhibit heating and cooling expansion coefficients of about $12-14 \times 10^7$/°C. over this higher temperature range. Advantageously, the chemically modified batches of the invention provide ceramics with no significant increases in these values over the range of interest, provided only that the chemical batch component is maintained at concentration levels below about 45% of the batch. As indicated by the data presented in Tables I and II, the selection of batch compositions incorporating 25–40% by weight of chemical components will offer particular advantages for ceramic regenerator applications, since cordierite ceramics having average CTE values (RT-800° C.) not exceeding about $4.8 \times 10^{-7}$/°C. in combination with MOR strengths of at least 4000 psi and porosities not exceeding about 20% by volume, more preferably 18% by volume, are attainable in that range.

As previously indicated, the results obtained in these mixed batch systems depend in part on maintaining the proportions of powdered oxidic aluminum, magnesium and silicon compounds in the chemical batch component within a range which is effective to develop a principal cordierite phase on firing. In one series of comparative experiments, the use of a silica-rich chemical batch component containing silica in a proportion approximately 10% in excess of the proportion in stoichiometric cordierite did not yield ceramic products with the desired combination of improved properties, even when the relative proportions of the chemical and mineral batch components were in the optimum range. Thus chemical batch components wherein each oxidic constituent is present in a proportion which is within 5% of the proportion thereof in stoichiometric cordierite are preferred.

While the invention has been particularly described above with respect to specific examples of compositions, materials, apparatus and/or procedures, it will be recognized that those examples are presented for purposes of illustration only and are not intended to be limiting. Thus numerous modifications and variations upon the compositions, materials, processes and apparatus specifically described herein may be resorted to by those skilled in the art within the scope of the appended claims.

I claim:

1. A batch for a ceramic product consisting principally of cordierite which comprises a mineral component and a chemical component, the mineral component comprising clay and talc and the chemical component consisting essentially of a combination of the powdered oxides, hydroxides, or hydrous oxides of magnesium, aluminum and silicon, the batch having an overall oxide composition effective to yield a principal cordierite phase on firing and the chemical component of the batch constituting 5-50% by weight of the batch.

2. A batch in accordance with claim 1 wherein the chemical component of the batch comprises oxidic magnesium, aluminum and silicon compounds in a proportion effective to yield a principal cordierite phase on firing.

3. A batch in accordance with claim 1 which has an overall composition effective to yield a cordierite phase constituting at least 94% by weight of the ceramic upon firing.

4. A batch in accordance with claim 1 wherein clay and talc constitute the sole sources of silica and magnesia in the mineral component of the batch.

5. A batch in accordance with claim 1 having an overall composition, calculated in weight percent on an oxide basis, comprising about 41–56.5% $SiO_2$, 30–50% $Al_2O_3$, and 9–20% MgO.

6. A batch in accordance with claim 3 having an overall composition, calculated in weight percent on an oxide basis, which consists essentially of about 47–53% $SiO_2$, 33–41% $Al_2O_3$ and 11–17% MgO.

7. A batch in accordance with claim 6 wherein the chemical component makes up 25–40% by weight of the batch.

8. In the method for making a cordierite ceramic product which comprises the steps of compounding a batch containing source materials for silica, alumina and magnesia, shaping the batch into a green article, and firing the green article to convert the batch materials to cordierite ceramic, the improvement wherein:
the batch comprises a mineral component and a chemical component;
the mineral component comprises clay, talc and alumina;
the chemical component consists essentially of the powdered oxides, hydroxides and hydrous oxides of magnesium, aluminum, and silicon; and
the mineral component contributes 50–95% by weight and the chemical component 5–50% by weight of the fired cordierite ceramic.

9. A method in accordance with claim 8 wherein the chemical component of the batch comprises powdered oxidic magnesium, aluminum and silicon compounds in a proportion effective to yield a principal cordierite phase on firing.

10. A method in accordance with claim 8 wherein the batch has an overall composition effective to yield upon firing a cordierite ceramic wherein the cordierite phase constitutes at least 94% by weight of the ceramic.

11. A method in accordance with claim 8 wherein clay and talc constitute the sole sources of silica and magnesia in the mineral component of the batch.

12. A method in accordance with claim 8 wherein the batch has an overall composition comprising, in weight percent on an oxide basis, about 41–56.5% $SiO_2$, 30–50% $Al_2O_3$, and 9–20% MgO.

13. A method in accordance with claim 12 wherein the batch has an overall composition consisting essentially, in weight percent on an oxide basis, of about 47–53% $SiO_2$, 33–41% $Al_2O_3$ and 11–17% MgO.

14. A method in accordance with claim 13 wherein the chemical component makes up 25–40% by weight of the batch, and wherein the batch is shaped by extrusion into a green article of honeycomb configuration.

15. A ceramic article composed of at least about 90% by weight of cordierite ($2MgO.2Al_2O_3.5SiO_2$) which exhibits a modulus of rupture strength of at least 4000 psi, a total porosity not exceeding about 20% by volume, and an average coefficient of thermal expansion on at least one dimensional axis of the article not exceeding about $4.8 \times 10^{-7}/°C$. over the temperature range RT-800° C.

16. A ceramic article in accordance with claim 15 which exhibits a total porosity not exceeding about 18% by volume.

17. A ceramic article in accordance with claim 15 which is an extruded cordierite ceramic article of honeycomb configuration.

18. A ceramic article in accordance with claim 17 which exhibits average heating and cooling coefficients of thermal expansion in the range of about $12–14 \times 10^{-7}/°C$. over the temperature range of about 600°–800° C.

* * * * *

UNITED STATES PATENT AND TRADEMARK OFFICE
CERTIFICATE OF CORRECTION

PATENT NO. : 5,332,703
DATED : July 26, 1994
INVENTOR(S) : David L. Hickman

It is certified that error appears in the above-indentified patent and that said Letters Patent is hereby corrected as shown below:

Col. 1, line 16, "magnesium" should be "magnesia"

Col. 3, line 14, "$3-6 \times 10^{7}/°C.$" should be "$3-6 \times 10^{-7}/°C.$"

Col. 6, line 4 of Table II, "RT-8000°" should be "RT-800°"

Col. 6, line 6 of Table II, "3320" should be "3320"

Col. 6, line 10 of Table II, "490" should be "4190"

Col. 6, line 56, "$12-14 \times 10^{7}/°C.$" should be "$12-14 \times 10^{-7}/°C.$"

Signed and Sealed this

Thirteenth Day of December, 1994

Attest:

BRUCE LEHMAN

Attesting Officer

Commissioner of Patents and Trademarks